Dec. 12, 1967 R. E. MAINE 3,358,283
RADIO NAVIGATION SYSTEM
Filed July 23, 1965 4 Sheets-Sheet 1

INVENTOR
REUBEN E. MAINE

BY *Hurwitz & Rose*

ATTORNEYS

Dec. 12, 1967

R. E. MAINE 3,358,283

RADIO NAVIGATION SYSTEM

Filed July 23, 1965

INVENTOR
REUBEN E. MAINE

BY Hurwitz & Rose

ATTORNEYS

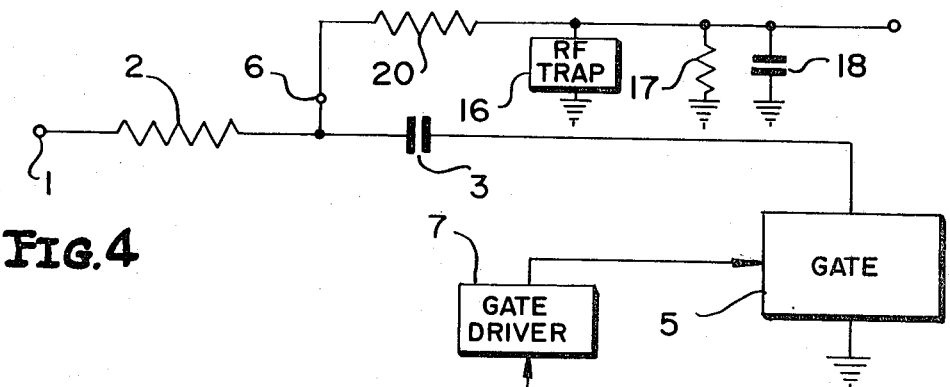
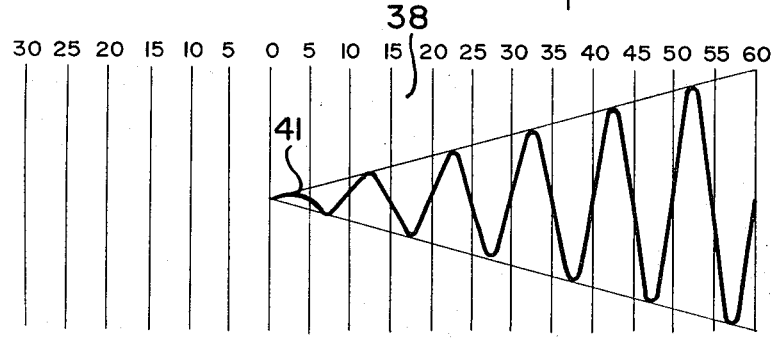
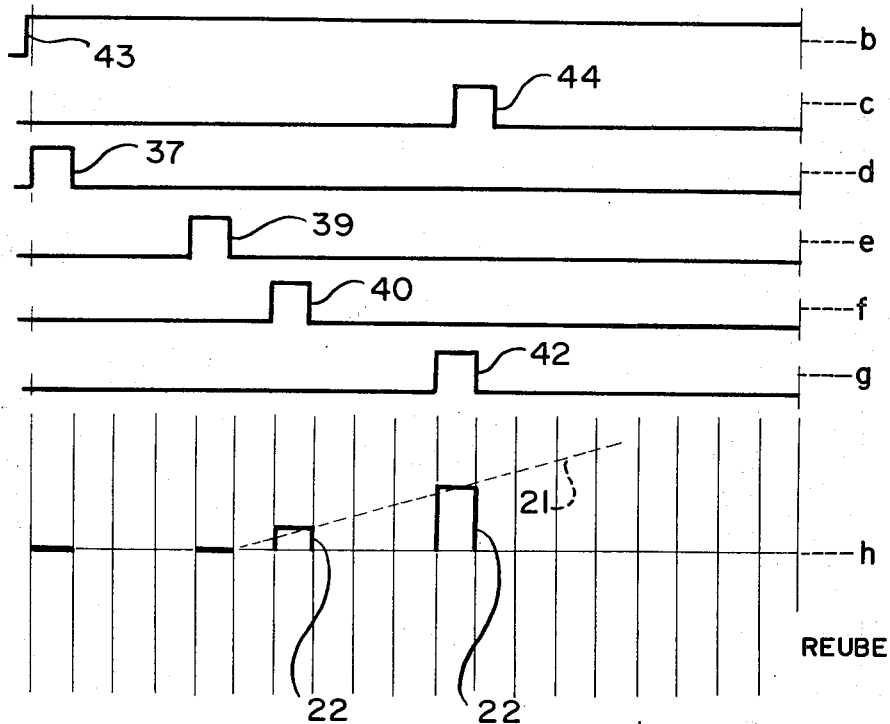
FIG. 4
FIG. 5
INVENTOR
REUBEN E. MAINE

Dec. 12, 1967  R. E. MAINE  3,358,283
RADIO NAVIGATION SYSTEM
Filed July 23, 1965  4 Sheets-Sheet 4

INVENTOR
REUBEN E. MAINE
BY
Hurwitz & Rose
ATTORNEYS

United States Patent Office 3,358,283
Patented Dec. 12, 1967

3,358,283
RADIO NAVIGATION SYSTEM
Reuben E. Maine, Charlottesville, Va., assignor to Electronic Concepts, Inc., Charlottesville, Va., a corporation of Virginia
Filed July 23, 1965, Ser. No. 474,339
17 Claims. (Cl. 343—103)

The present invention relates to radio navigation systems of the type utilizing the time difference in the propagation of radio pulses from synchronized ground stations and to detectors which integrate selectively gated half cycles of the radio frequency signals, thus reducing the noise that appears during such half cycles.

Systems for radio navigation of the present type employ pairs of synchronized ground stations that transmit radio pulses having at the instant of radiation a fixed time relation to each other. One of the stations is referred to as the master station and the other as the slave staion. Each pair of ground sations transmits pulses at its assigned repetition rate for the purpose of station selection. The pulses are radiated to receiving equipment located on aircraft or ships whose position is to be determined. By means of the receiving equipment, the operator on the craft determines the time difference between the pulses from the two transmitter stations as they arrive at the receiver. Since the radio pulses travel from the ground transmitters to the receiver at a known propagation rate (i.e., at the velocity of light), it is known that the position of the craft is at some point on a line corresponding to the time difference reading. By obtaining the time difference reading from a second pair of ground stations, a second line corresponding to the second time difference reading is obtained, and the intersection point of the two lines locates the position of the craft. Special maps having "time difference" lines printed thereon for the several pairs of ground stations are available for use with such a navigation system.

To measure the time difference in the arrival of successive pulses from master and slave stations, the receiving apparatus produces timing marker pulses that have a known time interval between them. Also, it produces pulses having a definite time relation to the timing marker pulses for the purpose of driving or synchronizing cathode ray deflection circuits. These deflection circuits produce cathode ray sweep traces on which the timing marker pulses and the received ground station pulses appear.

In selecting a particular pair of ground stations, the operator selects a particular pulse repetition rate for the driving or synchronizing pulses corresponding to the repetition rate of the pulses transmitted from said pair so that the deflection circuits may be synchronized with the received pulses from the selected pair of ground stations. Thus, a particular pair of ground stations is selected at the receiver apparatus by turning a station selection switch to the position indicated on the receiver panel, and in this manner obtaining sweep synchronizing pulses having the same repetition period as that of the pulses being transmitted from the selected pair of ground stations. The received pulses from the selected pair of ground stations can be made to appear stationary on the cathode ray trace whereas those received from the other pairs of ground stations will move rapidly along the same trace.

In operation, the pulses from the two transmitter stations of a selected pair of stations are made to appear on two parallel cathode ray traces, the master pulse on one trace and the slave pulse on the other. They are then brought into alignment or coincidence by moving one of them along its cathode ray sweep trace. It is then possible to measure the time displacement of the sweep required for pulse alignment, this also being the time difference in the arrival of the pulses from each of the selected pair of transmitter stations.

The above-described radio navigation system, commonly termed Loran, provides position readings in all kinds of weather conditions and at very great distances from the transmitting stations. Standard Loran systems (Loran A) use frequencies in the range of 1850 to 1950 kilocycles. In an effort to extend ground wave coverage and hence reduce the number of stations required, low frequency Loran systems have been established at an allocated frequency of 100 kilocycles. These systems are referred to as Loran C.

In the operation of the system, it is required that the master pulse and the slave pulse be matched in order to determine the phase difference therebetween and thus, the location of the receiver from each station can be determined as previously described. The locus of such location points is a hyperbolic line of known position.

There are various techniques for measuring the time relation between the received master and slave pulses. Since the maximum error of measurement must be considerably less than the length of a pulse, it is one technique to make the time measurement between corresponding points on the pulse envelopes. For example, the measurement might be made between the points of inflection on the leading edge of the envelope of each of the pair of pulses. However, with pulses having a long rise time, as with Loran C operation, it is difficult to determine with precision a particular point on the pulse envelope for time measurement.

Cycle matching has been proposed in which the time measurements are made, not between points on the pulse envelopes, but between corresponding points on the radio frequency cycles of the carrier. The time of a point on a carrier cycle, such as the point where the signal crosses zero, can be determined with much greater precision than a point on the envelope because the slope of the radio frequency cycle on passing through zero must necessarily be much steeper than the slope of the pulse envelope which contains the cycle. One of the difficulties in using the cycle matching technique, in which the time measurement is made between zero crossover points in the cycles of the respective pulses, is that a cyclic ambiguity will exist in the measurement. That is, the time measurement may be off by the amount of a cycle or multiples thereof since there are many zero crossover points during the reception period of the pulses.

Cycle matching may be achieved by utilizing a local oscillator having the same frequency as the carrier of the Loran signals, phase matching the output of the oscillator with the master pulse and then phase shifting the output of the oscillator to match it in phase with the carrier of the slave pulse, the amount of phase shift being an indication of the time difference between the received master and slave signals. Thus, a receiver may utilize pulse matching of the received master and slave pulses as well as cycle matching of the carrier signal for a vernier indication of the delay.

The approach to cycle identification utilized in accordance with the present invention is that of matching the slope of the leading edge of the master pulse envelope with that of the slave. This is generally quite difficult, often leading to errors of matching in 10-microsecond multiples in the case of Loran C. In order to accurately measure the time phase difference, or the delay, between the two pulses, corresponding cycles must be identified. In Loran C, the rise time of the envelope is about 50 to 70 microseconds. At 100 kc., this corresponds to a rise time of five to seven cycles of the carrier. If selected half cycles of the leading edge of the master pulse are identified, each having a different amplitude, and if selected half cycles of the leading edge of the slave pulse are also identified, matching of the corresponding cycles is possible by comparing their respective amplitudes, since the slopes of the master and slave envelopes are substantially equal. Thus, the time phase difference between the pulses is related to the slope of the pulse envelope. The time phase difference between the pulses may be determined by measuring the phase shift necessary to bring about coincidence of the corresponding cycles of each pulse of a transmitted pair. This results in the matching of the slopes of the pulse envelopes. Since the rise time of a Loran C pulse is about 50–70 microseconds, an accuracy of 2.5 to 3.5 microseconds is obtained in the match. This is sufficiently close to permit the identification and matching of the corresponding RF carrier cycles for the exact delay measurement, since a half cycle is 5 microseconds in length. The present invention provides a novel solution for matching the leading edges of the pulses transmitted by two selected transmitting stations by accurately identifying the first cycles and selected other cycles of the RF pulses for determining the slope of the envelopes and measuring the precise delay.

An important requirement for obtaining a good match of the leading edges of two pulses transmitted by selected Loran transmitters is reception of the signals in an accurate and undistorted form. High noise levels are characteristic of the 100 kc. band and Loran C signals may be 10 to 20 db below the average noise level. Since noise is proportional to received bandwidth, it is desirable to maintain as narrow a bandwidth as possible, but at the same time providing a bandwidth that is sufficiently wide so as to pass the envelope risetime without distortion. This is important because, as previously indicated, the slope of that portion of the envelope corresponding to the risetime of the pulse is the basis for providing the accurate match required.

Another requirement for obtaining a good match of the leading edges of the two pulses transmitted by selected Loran transmitters is low signal-to-noise ratio detection of the received Loran signals. The techniques of the prior art, which have generally been used, require that the pulses be differentiated one or more times. This worsens the already poor signal-to-noise ratio of the signal, since it is made noisier by the differentiating process.

It is the purpose of the present invention to provide a means of cycle identification wherein the first operation on the radio frequency signal is one of integration which offers improved performance under adverse noise conditions.

The present invention involves a novel gated detection and sampling circuit which detects only selected half cycles of a radio or intermediate frequency signal along with means for integrating the detected half cycles with noise superimposed thereon, and a Loran system incorporating such a gated detector.

Although the specific embodiment of the invention described herein relates to a receiver for Loran C operation, the present invention is not so limited, and the following description is merely intended as exemplary.

The gated detector of the present invention is useful not only in Loran systems, but in all places where it is desired to detect information on a carrier frequency where a reduced signal-to-noise ratio of the detected signal is required.

It is a principal object of the present invention to provide a gated detection system for detecting the amplitude of selected half cycles of a carrier frequency signal wherein the signal-to-noise ratio is less for the detected signal than for the received signal.

A further object of the present invention is to provide a gated detection system for detecting the slope of a carrier frequency pulse envelope wherein only selected half cycles of the carrier frequency are detected and wherein the half cycles that are detected are integrated to reduce the effect of noise on the carrier frequency pulses.

Another object of the present invention is to provide a gated detection system for detecting the slope of a carrier frequency pulse envelope wherein both positive and negative half cycles are sampled in order to completely reconstruct the leading edge of the carrier frequency pulse.

A still further object of the present invention is to provide a Loran system having gated detection means for detecting the slope of a carrier frequency pulse envelope wherein only selected half cycles of the carrier frequency are detected and wherein the half cycles that are detected are integrated to reduce the effect of noise on the signal content of the pulses.

Yet another object of the present invention is to provide a Loran system wherein the leading edges of corresponding pulses received from a pair of Loran transmitters may be easily matched under adverse noise conditions by identifying the corresponding first RF half cycles and selected other half cycles, integrating each selected half cycle to reduce the noise content, and superimposing them to provide an indication of the phase difference between the corresponding transmitted pulses.

An additional object of the present invention is to provide a Loran system which is capable of satisfactory operation over great distances under adverse noise conditions.

These and other objects of the present invention will be apparent from the following specifications and drawings of which:

FIGURE 1 is a schematic diagram of one embodiment of the gated detector of the present invention;

FIGURES 2a–h are waveforms as they appear in the detection and display apparatus of one embodiment of the present invention;

FIGURE 4 is a schematic diagram of a second embodiment of the gated detector of the present invention;

Figure 3:
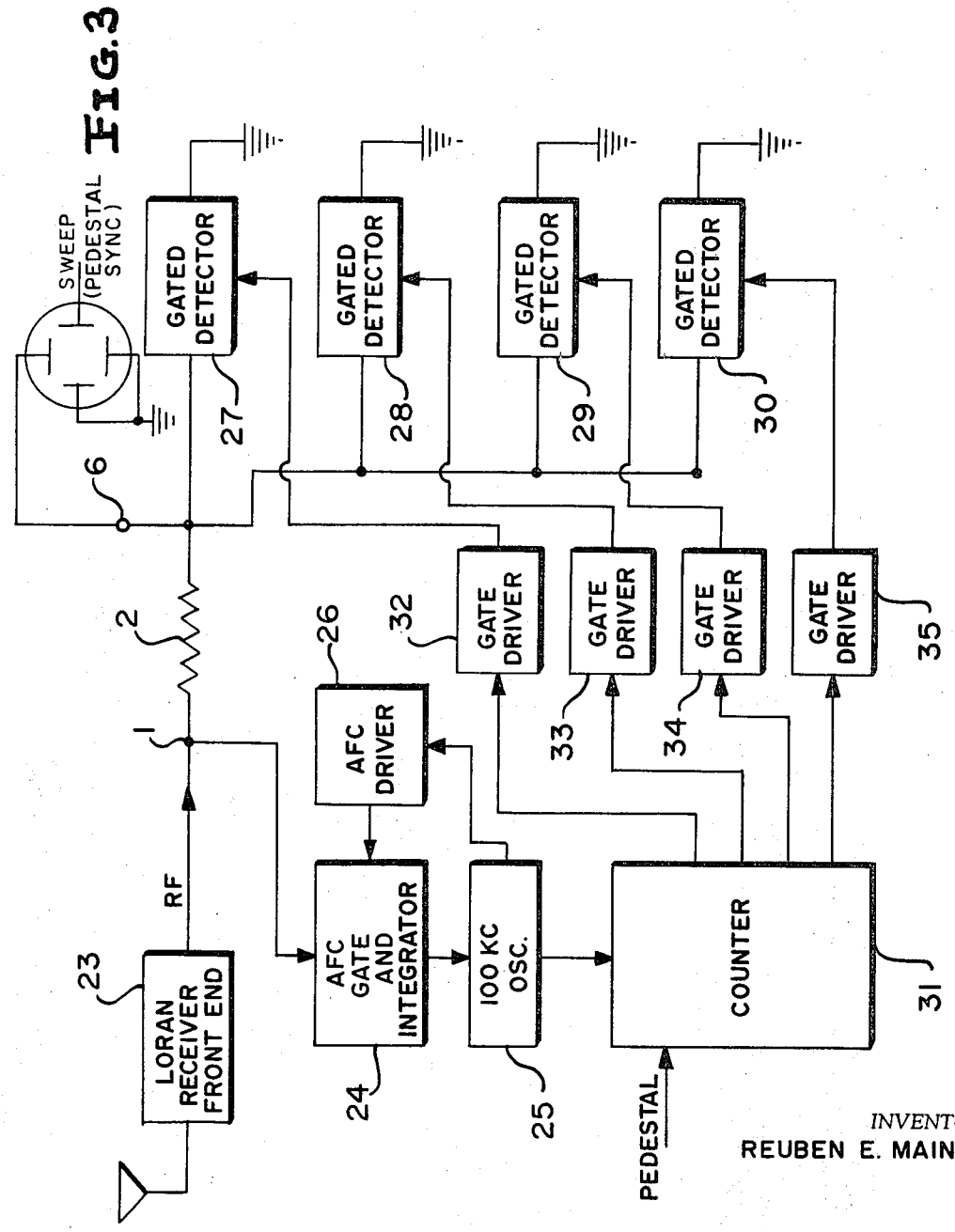
FIGURE 3 is a schematic diagram of a portion of a Loran receiver and associated circuitry for identifying the first RF cycle of a Loran pulse and sampling selected RF cycles in accordance with one embodiment of the present invention.
Figure 6A:
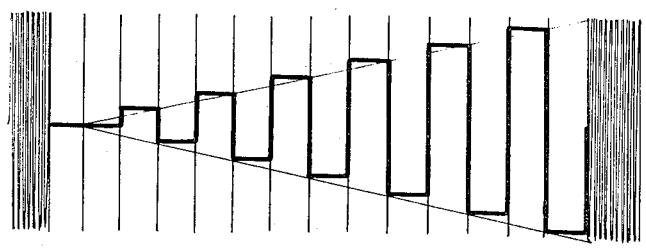
Figure 7:
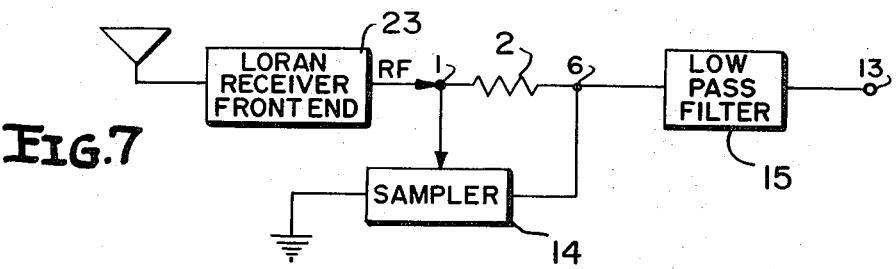
Figure 8:
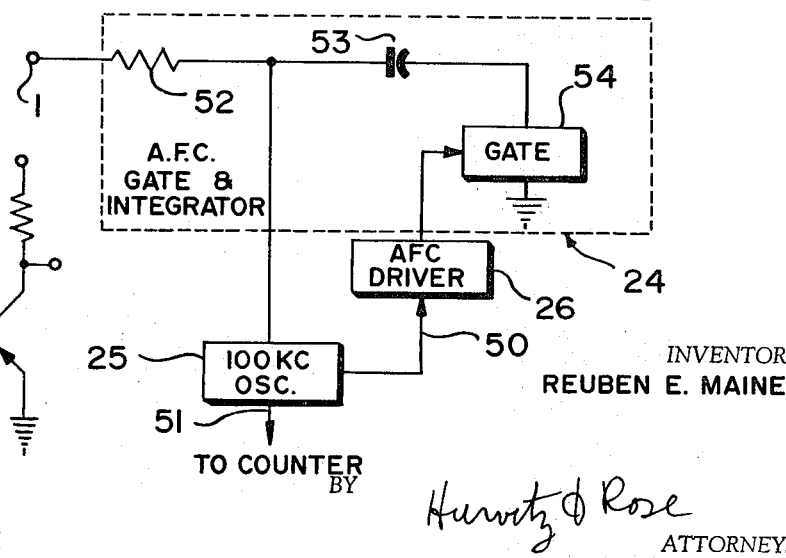
Figure 9:
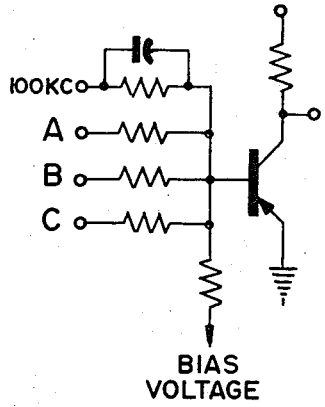

FIGURES 5a–h are waveforms as they appear in the detection and display apparatus of a second embodiment of the present invention;

FIGURES 6a and b are waveforms as they appear in the display apparatus of other embodiments of the present invention;

FIGURE 7 is a schematic diagram of another embodiment of the present invention;

FIGURE 8 is a schematic diagram of one circuit of the system shown in FIGURE 3;

FIGURE 9 is a schematic diagram of another circuit of the system shown in FIGURE 3.

Figure 1:
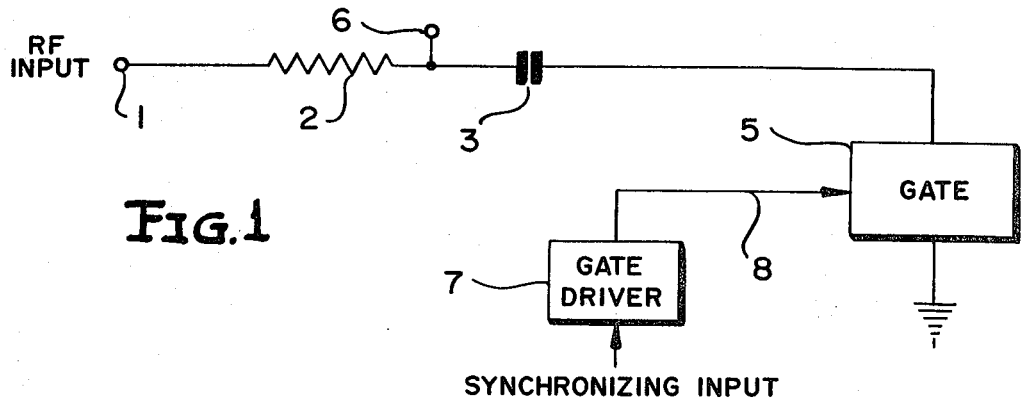

Referring now to FIGURE 1, showing the detector of the present invention, the RF signals and noise are coupled to the detector from the receiver front-end stages through terminal 1. Terminal 1 is electrically connected to a resistor 2 which is in series with capacitor 3. Gate 5, which may be any conventional transistor switching circuit, is interposed in series between capacitor 3 and the reference potential, which is illustrated as ground. An output terminal 6 is positioned between resistor 2 and capacitor 3. A gate driver 7 supplies DC pulses of a half cycle duration to the gate control electrode 8 of gate 5. This causes the gate to conduct at a given pulse rate wherein each period of conduction is of a half cycle duration. The gate driver 7 is pulsed by a signal which is synchronized with the incoming RF signal.

The circuit of FIGURE 1 performs an integrating function for the integration of a half cycle of the RF carrier input pulses. When gate 5 is conducting, capacitor 3 is effectively grounded. Since the output 6 is taken across the capacitor 3 for a selected half cycle, the output is an integral of the input, providing a DC sample voltage equal to the average energy of the detected half cycle. When the gate 5 is non-conducting, the previously grounded terminal of capacitor 3 is effectively open-circuited and the input signal at terminal 1 flows to output terminal 6 without any substantial alteration. The DC stored level of the RF signal is observed on the gate side of resistor 2 whenever the gate is sampling. The DC level may be positive or negative, corresponding to the average value of the input cycle being sampled. In the case where the gate is conducting for detection of a selected half cycle of radio frequency, the half cycle as well as the noise will be integrated. Since the noise has, on the average, an equal positive and negative signal-time value, it will integrate to zero.

Even when the noise level is much higher than the positive or negative half cycle being sampled, over a period of time, the noise energy will average zero while the total energy remaining will be that of the positive or negative half cycle. When the gate 5 is conducting, capacitor 3 charges to this average value through resistor 2. When gate 5 is non-conducting, no current flows through the series circuit and the capacitor neither charges nor discharges. Pulses 9 and 10 in FIGURE 2h are representative of the integrated value of the average noise level, with no other signal present, and will have a relatively steady zero amplitude. Pulses 11 and 12 represent the integrated value of the average noise level plus the amplitude of the radio frequency positive half cycles, shown in FIGURE 2a.

When gate 5 is conducting, the voltage on capacitor C appears at point 6 free from noise. Because there is no load placed on the integrating capacitor, long-time constants are easily obtained. As such, the charging of capacitor C, which is occurring during the sampling period, has a very small effect on the voltage. When gate 5 is non-conducting, the input signal appears at 6 substantially unaltered.

FIGURE 3 shows a portion of a Loran receiver employing the detection apparatus of FIGURE 1. Loran receiver front end 23 is tuned to receive RF signals from a pair of Loran transmitters and delivers RF energy to terminal 1. For Loran C operation, the radio frequency carrier would be 100 kc. The RF signal controls a loop of elements including an AFC gate and integrator 24, an oscillator 25, and an AFC driver 26. The AFC driver 26 and the AFC gate and integrator 24 maintain the phase relation between the gated sample and the RF input carrier cycles, since the oscillator 25 is phase locked to the RF carrier by these AFC circuits. In particular, the AFC gate and integrator 24 comprises a circuit arrangement, as shown in FIGURE 8, which is similar to that used for the gated detector shown in FIGURE 1. The oscillator 25 produces two 100 kc. waveforms, one being 90 degrees out of phase with the other. The 90-degree phase shifted waveform is fed to the AFC driver 26 through lead 50. The driver 26 produces a 5-microsecond square wave output pulse which causes gate 54 to become conductive for a period of one-half cycle. During this half cycle sampling period, the input signal at terminal 1 is zero and the gating signal on lead 50 is at a maximum since the gating signal must be 90 degrees out of phase with the input signal. The average amplitude of the half cycle being sampled then appears on the gate side of resistor 52 and across the capacitor 53 as a DC pulse free of noise. This pulse is fed to a voltage controlled capacitor (not shown) in the oscillator circuit which maintains the oscillator waveforms in phase with that of the input signal. Deviations in phase are corrected by the change in amplitude of the DC pulse across the controlled capacitor, and thus the 100 kc. output on lead 51 drives the counter 31 in phase with the input carrier frequency signal. The 5-microsecond pulse 44, produced by the AFC driver to turn on the gate 54 during a selected half cycle period 90 degrees out of phase with the waveform on lead 51, need not be generated on every cycle of the 100 kc. oscillator. This AFC pulse may be generated once during the first three cycles of the RF carrier pulse, as shown in FIGURES 2c and 5c. This is provided by including a simple counter, of a conventional type, in the AFC driver circuit to produce an output pulse only after a given number of input cycles are received from the oscillator 25. Alternatively, the AFC pulse may be produced by coupling the output of counter 31 to the AFC driver 26 through a conventional coincidence circuit of the type illustrated in FIGURE 9. Counter 31 steps with each cycle of the oscillator 25, producing a binary output which counts the cycles beginning with the starter pulse 43 (pedestal). The output of the counter is coupled to drivers 32–35 which may be any conventional coincidence circuit that produces a 5 microsecond pulse in response to a particular binary output from counter 31. For example, each driver may comprise a conventional parallel diode coincidence circuit or a coincidence circuit of the type illustrated in FIGURE 9. The inputs termed A, B and C refer to the various stages of counter 31 that produce the binary output. The 100 kc. input provides the 5-microsecond output pulse duration required to gate the detectors 27–30. As the output of counter 31 changes sequentially, each gate driver responds, in its turn, to a particular binary output such that driver 32 produces a pulse during a first half cycle period (5 microseconds) after the pedestal pulse 43 starts the counter; driver 33 produces a pulse during the fifth half cycle period; driver 34 produces a pulse during the seventh half cycle period; and driver 35 produces a pulse during the eleventh half cycle period. The output pulse produced by each driver gates on the corresponding detector for a half cycle period during the above stated selected half cycles.

The RF signal is fed through resistor 2 to the group of gated detectors 27–30, each of the type shown in FIGURE 1. Thus, each gated detector 27–30 has a capacitor equivalent to the capacitor 3, of FIGURE 1, associated therewith. The number of detectors connected in parallel depends on the number of points in the RF envelope that are desired to be sampled. The four detectors of FIGURE 3 are merely exemplary and provide the four sampling points shown in FIGURES 2 and 5. The detectors are gated on sequentially by the time sequence of pulses produced by the drivers 32–35 and those that are not being gated at any given time are substantially open-circuited to ground and thus have no effect on the signal at terminal 6. The output from terminal 6 is coupled to an oscilloscope or other means for providing a visual presentation.

In operation a pedestal pulse 43 is generated which initiates the scope sweep and starts the counter. This, in turn, initiates the sampling circuits. The AFC gate, as previously described provides an error signal that keeps the 100 kc. oscillator 25 locked in phase to the received signal. The AFC gate pulse 44 gates the RF signal to the AFC circuitry during the time that the RF signal crosses the zero axis, i.e., 90 degrees (2.5 microseconds) out of phase with the sampling gates. The counter 31 generates a sequence of output signals which are fed to the gate drivers 32–35. The gate drivers successively turn on the gated detectors 27–30 in accordance with the time sequence of the counter output signals. The several generated gating pulses permit the observance of the shape of the received signal and thus, the slope of the envelope may be determined. Both the master and slave pulses are sampled in the same manner. A separate oscillator and AFC circuit may be provided for the master and slave pulses, in which case each would be phase-locked to the other.

The counter 31 provides a gate signal which triggers the appropriate gate driver to produce a sampling pulse 37. The sampling pulse 37 turns on its associated detector to sample the RF input at a point 30 microseconds ahead of the Loran pulse. Any indication other than zero here will warn that a skywave observation is being made and thus, this pulse is used as a skywave guard. One RF cycle (10 microseconds) ahead of the normally expected Loran pulse, a gate signal 39 is generated by the counter and gate driver to indicate whether or not a Loran pulse is being received at that time. This pulse occurs during the fifth half cycle period. Since this pulse provides a zero reading, as shown in FIGURE 2h, the next sample will indicate the first RF cycle. Thus, gate signal 40 is generated by the counter and driver, and should be coincident with the first RF half cycle 41. This pulse occurs during the seventh half cycle period of the counter. Integration of the first positive RF half cycle signal with noise superimposed thereon produces a DC pulse 11 of a given amplitude. The fourth sampling point is provided 20 microseconds after the initiation of the first half cycle in order to gate the detector during the time interval of the third positive half cycle. Pulse 42 occurs during the eleventh half cycle period of the counter. The amplitude of the third positive half cycle is indicated by the DC pulse 12 in FIGURE 2h.

The result of the sampling operation is that a noise free representation of the amplitudes of the first and third positive half cycles of the master and slave pulses are presented on the oscilloscope for observation.

In the operation of the system, the operator adjusts the gain such that the samples of the first cycles are of equal amplitude. If the cycle selection is correct, the samples of the third cycles will have equal amplitudes and can be matched; if not, an amplitude discrepancy will exist and the delay setting must be changed by 10 microseconds (one full cycle) and the procedure repeated. When the first cycle of the master pulse is matched to the first cycle of the slave pulse, having their amplitudes adjusted to be equal, and the third cycle of the master pulse is matched to the third cycle of the slave pulse, the slopes of the master and slave pulses are matched. The precise time-phase difference is then measured by bringing the amplitudes of the corresponding cycles of the master and slave pulses into coincidence on the oscilloscope and measuring the amount of phase shift necessary to bring such coincidence about. In this manner, accurate identification of the corresponding cycles of a pair of transmitted pulses is achieved and a precise delay measurement is made. Although the operation has been described for manually operated receivers, it may also be adapted to automatic operation.

Figure 2:
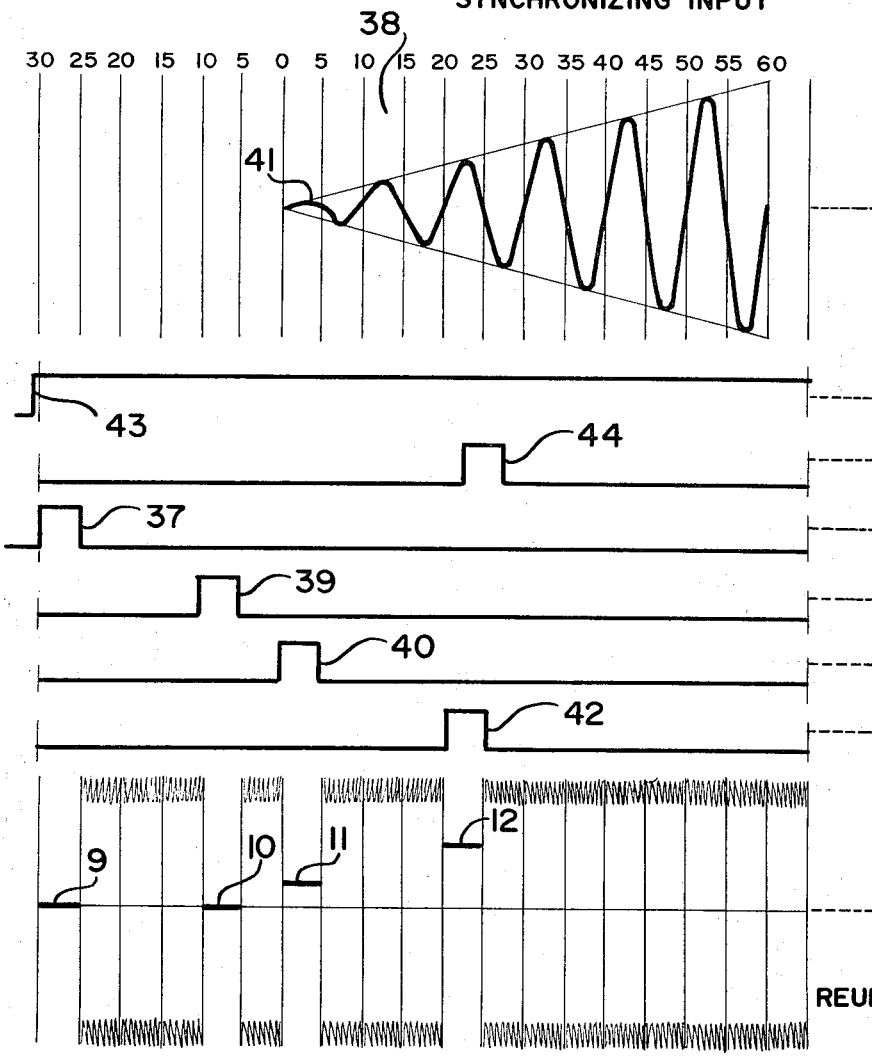

Another embodiment of the present invention utilizes the gated detector circuit shown in FIGURE 4. This gated detector circuit when used in the sampling system of FIGURE 3 produces the envelope 21 of FIGURE 5h. The generated pulses shown in FIGURES 5b, c, d, e, f and g are identical with those shown in FIGURE 2. The leading edge of the Loran pulse in FIGURE 5a is also identical with that shown in FIGURE 2. The RF energy and noise that accompany the DC pulses shown in FIGURE 2h are not present due to the RF trap 16 and smoothing network 17 and 18.

Another embodiment of the present invention utilizes the technique of sampling both the positive and negative half cycles. Thus, the leading edge of the Loran C pulse is completely reconstructed as shown in FIGURE 6a. Additional gated detectors, with their associated drivers, are provided in the sampling system of FIGURE 3. The counter 31 then provides gating signals in succession, sequentially driving the detectors such that each detector is gated on for the interval of 5 microseconds, for a given number of half cycles, both positive and negative, corresponding to the total number of half cycles desired of the leading edge of the Loran C pulse.

Figure 6B:
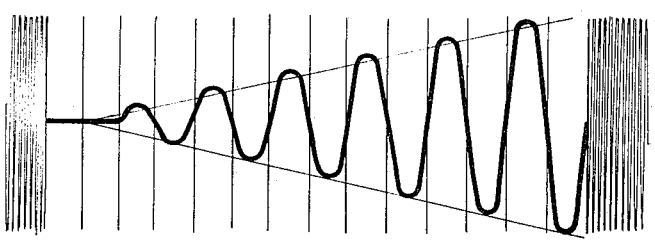

A further embodiment of the present invention is shown in FIGURE 7. The system shown is essentially that of FIGURE 3 with the addition of the lowpass filter 15. Sampler 14 includes the AFC circuits, the oscillator, the counter, the drivers, and the detectors shown in FIGURE 3. The sampler provides gating signals to sample both the positive and negative half cycles and as such, the reconstructed waveform of FIGURE 6a is produced at terminal 6. By passing this waveform through the lowpass filter 15, the sharp corners of the pulses are rounded and a signal is produced at terminal 13 of the form shown in FIGURE 6b. This signal reproduces the leading edge of a noise-free Loran C pulse even though the actual Loran C pulse being received is below the noise level.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A receiver comprising
means for receiving radio frequency carrier pulse signals from a pair of Loran transmitters;
means for generating an electrical signal having the same frequency and phase as the received carrier signals;
means responsive to said generated signal for producing a sequence of gating pulses corresponding, in time, with selected half cycles of said received carrier signals;
a plurality of parallel connected detector means serially connected to said receiving means; each of said detector means being responsive to said gating pulses for sequentially detecting said selected half cycles of said received carrier signals to produce a plurality of D.C. pulses corresponding to said half cycles.

2. The receiver according to claim 1 further comprising
means for providing a visual presentation of said D.C. pulses.

3. The receiver according to claim 1 wherein said detector means includes means for integrating the detected signal.

4. The receiver according to claim 3 wherein said detector means includes means for selectively completing a circuit to permit said means for integrating to respond to the received carrier frequency signal during said selected half cycles.

5. A receiver comprising
means for receiving a transmitted radio frequency carrier signal;
detector means for detecting the amplitude of selected half cycles of said carrier signal; said detector means comprising means for integrating the detected signal, and switching means for operatively coupling the received carrier frequency signal to the means for integrating during said selected half cycles and for isolating said integrating means during all intervals other than said selected half cycles, so that the results of past integration may be retained by said integrating means for a desired period of time.

6. The receiver according to claim 5 wherein said means for switching is synchronized with said received carrier frequency signal.

7. The receiver according to claim 6 further comprising means for providing a visual presentation of the amplitude of said detected half cycles.

8. A method for detecting selected half cycles of a transmitted radio frequency signal comprising the steps of receiving said radio frequency signal; generating an electrical signal having the same frequency and phase as said received carrier signal; producing a sequence of gating pulses corresponding, in time, with selected half cycles of said received carrier signal; and integrating said selected half cycles each over several time intervals during which the respective selected half cycle occurs in response to said sequence of gating pulses to produce a plurality of D.C. pulses corresponding to said half cycles.

9. The method of matching the pulses transmitted by a pair of Loran transmitters comprising
(a) receiving the transmitted pulses on a given carrier frequency channel;
(b) generating an electrical signal of the same frequency and phase as the carrier frequency of said pulses;

(c) counting the cycles of said generated electrical signal;

(d) sampling a first time interval equal to half the period of said carrier frequency cycle on said carrier frequency channel in response to a first number of counts of said generated electrical signal to indicate the absence of a transmitted pulse during said time interval;

(e) sampling a second time interval, one carrier cycle after said first time interval and for the same duration as said first time interval, in response to a second number of counts of said generated electrical signal to identify the first half cycle of the carrier frequency signal of the transmitted pulse;

(f) sampling a third time interval, a selected number of half cycles after said second time interval and for the same duration as said second time interval, in response to a third number of counts of said generated electrical signal; said selected number of half cycles being on the leading edge of the transmitted pulse; and (g) integrating the sampled half cycles of the transmitted pulse to remove the noise therefrom and to produce a plurality of D.C. pulses having amplitudes corresponding to each half cycle sampled, whereby the slope of the leading edge of the transmitted pulse may be determined.

10. In a radio navigation system in which signals are transmitted in predetermined time relationship from at least a pair of fixed transmitting stations for comparison at a receiving station to determine the position of the receiving station relative to the transmitting stations, the combination comprising, at said receiving station, integrating means for averaging signal, means for selectively completing a circuit for rendering said integrating means responsive to incoming signal, and means responsive to signal arriving from said transmitting stations to actuate said circuit completing means during only selected portions of the arriving signal for integration of said portions, and to isolate said integrating means in a circuit responsive sense during all but said selected portions.

11. The combination according to claim 10 further including means for displaying the signal levels derived by said integrating means from said arriving signal portions.

12. A receiver for a radio navigation system wherein a carrier frequency is modulated by pulses transmitted by at least a pair of transmitting stations at a predetermined time relationship, the time difference between arrival of the pulses from the pair of transmitting stations at the receiver of the receiving station being indicative of the position of said receiving station relative to said transmitting stations, said receiver comprising means for phase comparing said pulses to detect said time difference by matching the slopes of the leading edges of the pulse envelopes; said comparing means comprising integrating means for deriving average level of signal, means for selectively completing a circuit to render said integrating means responsive to the carrier frequency signal within each pulse envelope, and means synchronized with the incoming carrier frequency for controlling said selective circuit completing means to permit deriving average signal level during selected half cycles of said carrier frequency signal.

13. The combination according to claim 12 further including means for displaying the derived average signal levels for selected half cycles of said carrier frequency signal to permit matching thereof for the pulses received from the transmitting stations.

14. The combination according to claim 13 wherein said display means comprises an oscilloscope having sweep circuits synchronized with the operation of said controlling means.

15. The combination according to claim 13 wherein said integrating means comprises capacitive storage means, and a resistance connected to supply charging current deriving from incoming carrier frequency signal to said capacitive storage means when said circuit is selectively completed; and wherein said circuit completing means comprises normally non-conducting gate means coupling said capacitive storage means to a point of reference potential to permit charging or discharging of said capacitive storage means when said gate means is rendered conductive.

16. The combination according to claim 15 wherein said controlling means comprises a reference oscillator phase locked to said incoming carrier frequency for generating a waveform having the same frequency and in phase coincidence therewith, and means responsive to the output of said oscillator for driving said gate means to the conductive state in synchronism with application of said selected half cycles to said integrating means.

17. The combination according to claim 16 wherein said capacitive storage means comprises a plurality of capacitors coupled for parallel response to current deriving from said incoming signal, and wherein said gate means comprises a plurality of gate circuits each coupling a respective one of said capacitors to said point of reference potential, and wherein said driving means comprises a plurality of drive circuits each for actuating a respective gate circuit during a different selected half cycle of said carrier frequency to provide selective sampling of incoming signal by said capacitors.

References Cited

UNITED STATES PATENTS

| | | | |
|---|---|---|---|
| 2,811,717 | 10/1957 | Palmer | 343—103 |
| 3,028,487 | 4/1962 | Losee | 325—323 X |
| 3,042,800 | 7/1962 | Gluth | 325—474 |
| 3,111,654 | 11/1963 | Magasiny et al. | 329—109 |
| 3,231,823 | 1/1966 | Garfield | 328—127 X |

RODNEY D. BENNETT, *Primary Examiner.*

H. C. WAMSLEY, *Assistant Examiner.*